(12) United States Patent
Joseph et al.

(10) Patent No.: US 7,832,862 B2
(45) Date of Patent: Nov. 16, 2010

(54) PROCESS FOR THE MANUFACTURE OF SPECTACLE LENSES

(75) Inventors: Timothy Joseph, Allison Park, PA (US); Pierre Gerligand, Findcastle, VA (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 4 days.

(21) Appl. No.: 11/815,902

(22) PCT Filed: Feb. 14, 2006

(86) PCT No.: PCT/EP2006/002066

§ 371 (c)(1), (2), (4) Date: Dec. 5, 2008

(87) PCT Pub. No.: WO2006/084771

PCT Pub. Date: Aug. 17, 2006

(65) Prior Publication Data

US 2009/0135371 A1    May 28, 2009

Related U.S. Application Data

(60) Provisional application No. 60/652,614, filed on Feb. 14, 2005.

(51) Int. Cl.
*G02C 7/02* (2006.01)

(52) U.S. Cl. .................. 351/177; 351/159; 359/642; 452/42

(58) Field of Classification Search ......... 351/159–178; 359/642–807; 451/42
See application file for complete search history.

(56) References Cited

U.S. PATENT DOCUMENTS

| | | | |
|---|---|---|---|
| 4,170,092 | A | 10/1979 | Keane, Jr. |
| 5,485,771 | A | 1/1996 | Brennan et al. |
| 5,615,588 | A | 4/1997 | Gottschald |
| 2003/0101603 | A1 | 6/2003 | Feldman et al. |
| 2003/0181133 | A1 | 9/2003 | Siders et al. |
| 2003/0214058 | A1 | 11/2003 | Belly et al. |
| 2006/0167758 | A1 * | 7/2006 | Yancy .................. 705/26 |

FOREIGN PATENT DOCUMENTS

EP    1449616    8/2004

* cited by examiner

*Primary Examiner*—Darryl J Collins
(74) *Attorney, Agent, or Firm*—Occhiuti Rohlicek & Tsao LLP

(57) ABSTRACT

The invention provides methods for eliminating sharp edges that typically result during the production of uncut lenses.

16 Claims, 4 Drawing Sheets

Figure 4

| X\Y | -40 | -36 | -32 | -28 | -24 | -20 | -16 | -12 | -8 | -4 | 0 | 4 | 8 | 12 | 16 | 20 | 24 | 28 | 32 | 36 | 40 |
|---|---|---|---|---|---|---|---|---|---|---|---|---|---|---|---|---|---|---|---|---|---|
| 40 | -6.3 | -5.7 | -5.1 | -4.6 | -4.2 | -3.9 | -3.6 | -3.4 | -3.3 | -3.2 | -3.2 | -3.2 | -3.3 | -3.4 | -3.6 | -3.9 | -4.2 | -4.6 | -5.1 | -5.7 | -6.3 |
| 36 | -5.1 | -4.5 | -4.0 | -3.5 | -3.1 | -2.8 | -2.5 | -2.3 | -2.2 | -2.1 | -2.1 | -2.1 | -2.2 | -2.3 | -2.5 | -2.8 | -3.1 | -3.5 | -4.0 | -4.5 | -5.1 |
| 32 | -4.1 | -3.5 | -3.0 | -2.5 | | | -1.4 | -1.2 | -1.2 | -1.1 | -1.2 | -1.2 | -1.4 | -1.6 | -1.8 | -2.1 | -2.5 | -3.0 | -3.5 | -4.1 |
| 28 | -3.2 | -2.6 | -2.1 | | 310 B | 0.6 | -0.4 | -0.4 | -0.3 | -0.4 | -0.4 | -0.6 | -0.8 | -1.0 | -1.3 | -1.7 | -2.1 | -2.6 | -3.2 |
| 24 | | | | -0.6 | -0.3 | | 0.1 | 0.3 | 0.3 | 0.4 | 0.3 | 0.3 | 0.1 | -0.1 | -0.3 | -0.6 | | | |
| 20 | -1.9 | -1.3 | | | 0.0 | 0.3 | 0.5 | 0.7 | 0.8 | 0.9 | 0.9 | 0.9 | 0.8 | 0.7 | 0.5 | 0.3 | 0.0 | | | |
| 16 | -1.4 | -0.8 | -0.3 | 0.1 | 0.5 | 0.7 | 1.0 | 1.2 | 1.3 | 1.4 | 1.4 | 1.4 | 1.3 | 1.2 | 1.0 | 0.7 | 0.5 | 0.1 | -0.3 | -0.8 | -1.4 |
| 12 | -1.0 | -0.4 | 0.1 | 0.5 | 0.8 | 1.1 | 1.3 | 1.5 | 1.6 | 1.7 | 1.7 | 1.7 | 1.6 | 1.5 | 1.3 | 1.1 | 0.8 | 0.5 | 0.1 | -0.4 | -1.0 |
| 8 | -0.7 | -0.2 | 0.3 | 0.7 | 1.1 | 1.4 | 1.6 | 1.8 | 1.9 | 2.0 | 2.0 | 2.0 | 1.9 | 1.8 | 1.6 | 1.4 | 1.1 | 0.7 | 0.3 | -0.2 | -0.7 |
| 4 | -0.5 | 0.0 | 0.5 | 0.9 | 1.2 | 1.5 | 1.7 | 1.9 | 2.0 | 2.1 | 2.1 | 2.1 | 2.0 | 1.9 | 1.7 | 1.5 | 1.2 | 0.9 | 0.5 | 0.0 | -0.5 |
| 0 | -0.5 | 0.1 | 0.5 | 0.9 | 1.3 | 1.6 | 1.8 | 2.0 | 2.1 | 2.2 | 2.2 | 2.2 | 2.1 | 2.0 | 1.8 | 1.6 | 1.3 | 0.9 | 0.5 | 0.1 | -0.5 |
| -4 | -0.5 | 0.0 | 0.5 | 0.9 | 1.2 | 1.5 | 1.7 | 1.9 | 2.0 | 2.1 | 2.1 | 2.1 | 2.0 | 1.9 | 1.7 | 1.5 | 1.2 | 0.9 | 0.5 | 0.0 | -0.5 |
| -8 | -0.7 | -0.2 | 0.3 | 0.7 | 1.1 | 1.4 | 1.6 | 1.8 | 1.9 | 2.0 | 2.0 | 2.0 | 1.9 | 1.8 | 1.6 | 1.4 | 1.1 | 0.7 | 0.3 | -0.2 | -0.7 |
| -12 | -1.0 | -0.4 | 0.1 | 0.5 | 0.8 | 1.1 | 1.3 | 1.5 | 1.6 | 1.7 | 1.7 | 1.7 | 1.6 | 1.5 | 1.3 | 1.1 | 0.8 | 0.5 | 0.1 | -0.4 | -1.0 |
| -16 | -1.4 | -0.8 | -0.3 | 0.1 | 0.5 | 0.7 | 1.0 | 1.2 | 1.3 | 1.4 | 1.4 | 1.4 | 1.3 | 1.2 | 1.0 | 0.7 | 0.5 | 0.1 | -0.3 | -0.8 | -1.4 |
| -20 | -1.9 | | | | 0.0 | 0.3 | 0.5 | 0.7 | 0.8 | 0.9 | 0.9 | 0.9 | 0.8 | 0.7 | 0.5 | 0.3 | 0.0 | | | | |
| -24 | | 210 c | | -0.6 | -0.3 | -0.1 | 0.1 | 0.2 | 0.4 | 0.3 | 0.3 | 0.1 | -0.1 | -0.3 | -0.6 | | 210 d | | |
| -28 | -3.2 | -2.6 | -2.1 | -1.7 | -1.3 | -1.0 | -0.8 | -0.6 | -0.4 | -0.4 | -0.3 | -0.4 | -0.4 | -0.6 | -0.8 | -1.0 | -1.3 | -1.7 | -2.1 | -2.6 | -3.2 |
| -32 | -4.1 | -3.5 | -3.0 | -2.5 | -2.1 | -1.8 | -1.6 | -1.4 | -1.2 | -1.2 | -1.1 | -1.2 | -1.2 | -1.4 | -1.6 | -1.8 | -2.1 | -2.5 | -3.0 | -3.5 | -4.1 |
| -36 | -5.1 | -4.5 | -4.0 | -3.5 | -3.1 | -2.8 | -2.5 | -2.3 | -2.2 | -2.1 | -2.1 | -2.1 | -2.2 | -2.3 | -2.5 | -2.8 | -3.1 | -3.5 | -4.0 | -4.5 | -5.1 |
| -40 | -6.3 | -5.7 | -5.1 | -4.6 | -4.2 | -3.9 | -3.6 | -3.4 | -3.3 | -3.2 | -3.2 | -3.2 | -3.3 | -3.4 | -3.6 | -3.9 | -4.2 | -4.6 | -5.1 | -5.7 | -6.3 |

PROCESS FOR THE MANUFACTURE OF SPECTACLE LENSES

CROSS-REFERENCE TO RELATED APPLICATIONS

This application is being filed as a U.S. National Stage under 35 U.S.C. 371 of International Application No. PCT/EP2006/002066, filed on Feb. 14, 2006, which claims the benefit of U.S. Provisional Application No. 60/652,614, filed Feb. 14, 2005. The contents of both applications are hereby incorporated by reference in their entirety.

FIELD OF THE INVENTION

The present invention relates to ophthalmic lenses. In particular, the invention provides a process for the elimination of sharp lens edges in the manufacturing of spectacle lenses.

BACKGROUND OF THE INVENTION

The use of spectacle lenses for the correction of ametropia is well known. Typically, a polymeric article, conventionally known as a lens blank, is manufactured by casting or machining, which blank has a first surface having at least one refractive power. The second surface of the blank is then machined to provide what is known as an "uncut lens", the second surface of which has at least one additional refractive power. Prior to machining of the second surface, the diameter of the blank or uncut lens typically is reduced by cutting to a round shape, which cutting process is known as cribbing.

The machining of the second surface can result in formation of a sharp edge at the periphery of the uncut lens. The sharp edge is disadvantageous in that it is prone to cracking or chipping resulting in one or both of contamination of subsequent cleaning or coating steps of the manufacturing process and an unusable uncut lens. Additionally, the sharp edge makes the uncut harder to handle either manually or by machine. Finally, uncut lenses with sharp edges are more likely to exhibit coating defects and be rejected as unacceptable from a cosmetic basis.

In conventional lens manufacturing processes, any sharp edge that remains after machining is eliminated by hand-filing or grinding of the edge. Alternatively, the periphery of the blank or uncut lens may be cut, or cribbed, to an elliptical shape to eliminate the sharp edge. These methods are disadvantageous in that they either add labor and, thus, cost to lens production or the sharp edges are not eliminated in all cases.

SUMMARY OF INVENTION

In one aspect of the invention, a method for manufacturing a spectacle lens comprises using a thickness that is at least a minimum edge thickness, at least one of a plurality of a set of points associated with a thickness function, and at least one of a plurality of a set of points within a cribbed diameter to determine a contour for cutting an uncut lens blank having at least the thickness that is at least a minimum edge thickness.

In some embodiments, the thickness function can be determined using a model of a front and a back surface of the uncut lens to attain an optical prism target and a lens center thickness. In some embodiments, the minimum edge thickness is about 0.1 mm to about 2 mm.

In certain embodiments, the method can further comprising using a prism reference point of the front and back surface and a slope of the front and back surface at the prism reference point to attain the optical prism target and the lens center thickness. The cribbed diameter can be determined using a blocking location, wherein the coordinate system of the blocking location coincides with the coordinate system of the thickness function.

The method can further comprise using at least one of a plurality of a set of points meeting a minimum alloy allowance requirement to determine the contour for cutting the uncut lens blank.

The method can further comprise using at least one of a plurality of a set of points meeting an edging allowance requirement to determine the contour for cutting the uncut lens blank.

A cribbed uncut lens is disclosed comprising a thickness that is at least a minimum edge thickness and an edge contour within a cribbed diameter. In some embodiments, the cribbed uncut lens can have a minimum edge thickness of about 0.1 mm to about 2 mm. The cribbed uncut lens can have an edge contour which further meets a minimum alloy allowance requirement. The cribbed uncut lens can have an edge contour which further meets an edging allowance requirement.

In another embodiment, the method for manufacturing a spectacle lens comprises the steps of: a.) determining a minimum edge thickness for an uncut lens; b.) using the minimum edge thickness to determine a thickness requirement; c.) calculating a thickness function t of the uncut lens; d.) calculating a cribbed diameter of the uncut lens; e.) using the thickness function and cribbed diameter to determine a first set of points that does not satisfy the thickness requirement and a second set of points that satisfies the thickness requirement; f.) determining a third set of points that describe a diameter contained within the cribbed diameter; and g.) combining the second set of points with the third set of points to provide a blunt edge contour for the uncut lens The method of calculating a thickness function t of the uncut lens can further comprise (i) using an optical prism target and a lens center thickness and (ii) using a mathematical model of a front and a back surface of the uncut lens in a coordinate system wherein a prism reference point of each surface and a slope of each surface at the prism reference point is such that the optical prism target and center thickness will be attained.

The method of calculating a thickness function t of the uncut lens can further comprise using a blocking location and a crib diameter wherein the coordinate system of the blocking location is coincident with the coordinate system of step c.).

The method for manufacturing a spectacle lens can further comprise a step h.) comprising (i) representing a perimeter of an alloy as a set of points A, (ii) defining an alloy allowance by a set of distances AA wherein AA=B−A, and (iii) determining if a minimum alloy allowance has been exceeded.

The method for manufacturing a spectacle lens can further comprise a step i.) comprising (i) representing a final edged periphery of the lens as a set of points F, (ii) defining an edging allowance by a set of distances EA wherein EA=B−F, and (iii) determining if a minimum edging allowance has been exceeded.

The invention also relates to the production of a lens according to a method comprising using a thickness that is at least a minimum edge thickness, at least one of a plurality of a set of points associated with a thickness function, and at least one of a plurality of a set of points within a cribbed diameter to determine a contour for cuffing an uncut lens blank having at least the thickness that is at least a minimum edge thickness. The lens may also be produced according to a method further comprising a thickness function is determined using a model of a front and a back surface of the uncut lens to attain an optical prism target and a lens center thickness.

BRIEF DESCRIPTION OF THE DRAWING

FIG. 4 depicts the graph of FIG. 1 overlaid by a blunt edge contour B resulting from Equation IV.

DETAILED DESCRIPTION

Figure 1:
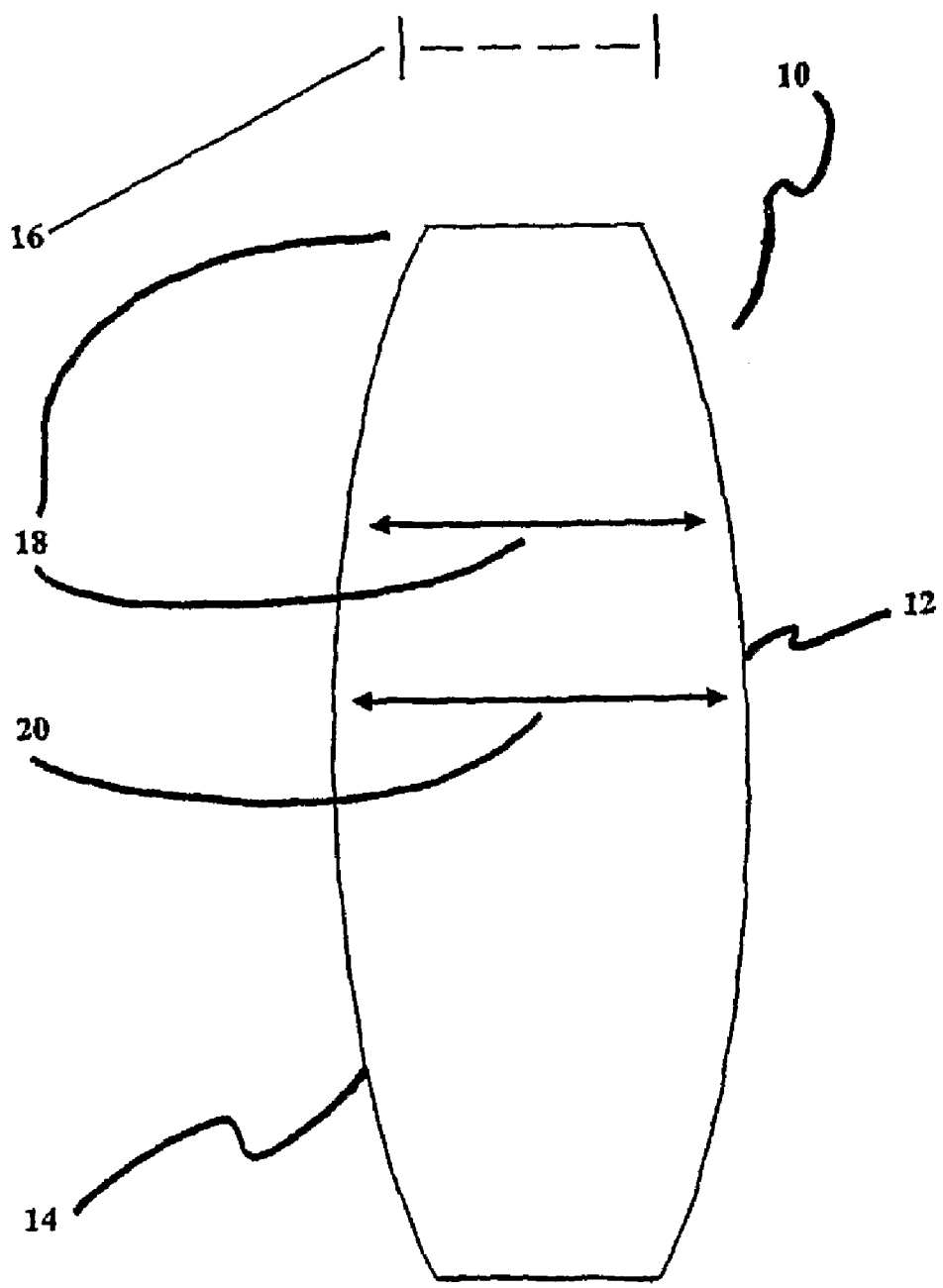
FIG. 1 depicts a cross-sectional view of a lens.

Referring to FIG. 1, in one embodiment, a method for manufacturing a spectacle lens 10 includes: a.) determining a minimum edge thickness 16 for an uncut lens; b.) using the minimum edge thickness 16 to determine a thickness requirement; c.) calculating a thickness function t for the uncut lens; d.) determining a cribbed diameter function for the uncut lens; e.) using the thickness function and cribbed diameter to determine a first set of points that does not satisfy the thickness requirement and a second set of points that satisfies the thickness requirement; f.) determining a third set of points that describe a contour contained within the cribbed diameter; and g.) combining the second set of points with the third set of points to provide a blunt edge contour for the uncut lens.

The present invention provides methods, and lenses produced by those methods, for eliminating sharp edges that typically result during the production of uncut lenses. The methods of the invention may be used to produce any type of spectacle lens, such as single vision and multifocal lenses.

Referring again to FIG. 1, a "lens blank" or "blank" 10 means a shaped, optically transparent article capable of refracting light that is suitable for use in producing a spectacle lens, one surface of which blank provides at least one refractive power. Typically, the lens blank has a front surface 12 that is nearest the object being viewed through a worn lens in which the blank is used and a back surface 14, which is the surface that is nearest the wearer's eye. The first refractive power may be all, or a portion, of the distance vision, near vision, intermediate vision, or cylinder power desired for the finished lens, or a combination thereof.

The lens blank production may be carried out by any convenient manner such as by casting, thermoforming, molding, machining, or a combination thereof. Materials suitable for use in forming the blank are any materials capable of use as a spectacle lens material. Illustrative materials include, without limitation, polycarbonates, such as bisphenol A polycarbonates, allyl diglycol carbonates, such as diethylene glycol bis-allyl carbonate (CR-39™), allylic esters, such as triallyl cyanurate, triallyl phosphate and triallyl citrate, acrylic esters, acrylates, methacrylates, such as methyl- ethyl- and butyl methacrylates and acrylates, styrenics, polyesters, and the like and combinations thereof. Additionally, the lens blank 10 may be formed from one or more of the phosphine oxides disclosed in U.S. Pat. No. 6,008,299 incorporated herein in its entirety by reference.

In a first step of the method, a minimum edge thickness 16, $ET_{min}$, is determined. The minimum edge thickness 16 is the desired minimum edge thickness 16 for the uncut lens to be produced from the lens blank. The edge thickness 18 is the thickness between the front and back surfaces of the uncut lens at the lens perimeter or the farthest point from the geometric center of the lens at any given angular position. The $ET_{min}$ will be determined based on a consideration of the minimum edge thickness 16 at which there will be no cracks or chips, that will facilitate handling, and that will alleviate formation of coating defects. Preferably, the $ET_{min}$ value will be about 0.1 mm to about 2 mm. The $ET_{min}$ is also used to establish a thickness requirement for the uncut lens, which requirement is $t \leq ET_{min}$.

Figure 2:
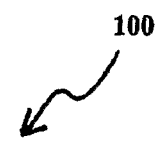
FIG. 2 depicts a grid of lens thickness values at their respective X and Y coordinate positions.

Referring to FIG. 2, the thickness 18, t, of the uncut lens is then calculated as a function of two-dimensional coordinates on the uncut lens. The coordinates calculated may be polar ($t=f(r,\theta)$), Cartesian ($t=f(x,y)$), or any convenient coordinates system. This calculation may be carried out by any convenient method. Preferably, the calculation is carried out by using the optical prism target and lens center thickness 20 targets, obtained using commercially available optical laboratory management software such as VISION™ software by Digital Vision, Inc., OPTIFACTS™ software by Optifacts, Inc, LABZILLA™ software by C.C. Systems, or the like. A mathematical model of the front and back surfaces of the lens may then be used in which the coordinate system of each surface is coincident with the prism reference point ("PRP") of each surface and in which the slope of each surface at the PRP is such that the desired optical prism will be achieved. For example, Frt(x, y) and Bck(x,y) may represent the front and back surface models, respectively, in Cartesian coordinates and can be used to define the thickness function as:

$$t(x,y)=Bck(x,y)-Frt(x,y)+Dto \qquad (I)$$

wherein Dto is the desired center thickness 20 for the uncut lens.

FIG. 2 is a chart, calculated using Equation 1, showing lens thickness values at their respective x and y coordinate positions.

The cribbed diameter, $C_{diam}$, of the uncut lens may then be calculated as a function of two-dimensional coordinates on the uncut lens. The coordinates may be polar, Cartesian, or any convenient coordinate system. The calculation may be carried out by any convenient method and preferably is carried out using the blocking location and crib diameter obtained from commercially available lab management software and in which the coordinate system of the blocking location and crib diameter are coincident with the PRP of the lens. For example, ($X_{BL}$, $Y_{BL}$) may represent the blocking location, in Cartesian coordinates and can be used to define the cribbed diameter functions as:

$$C_{diam}=2*(x-X_{BL})^2+(y-Y_{BL})^2)^{0.5} \qquad (II)$$

Figure 3:
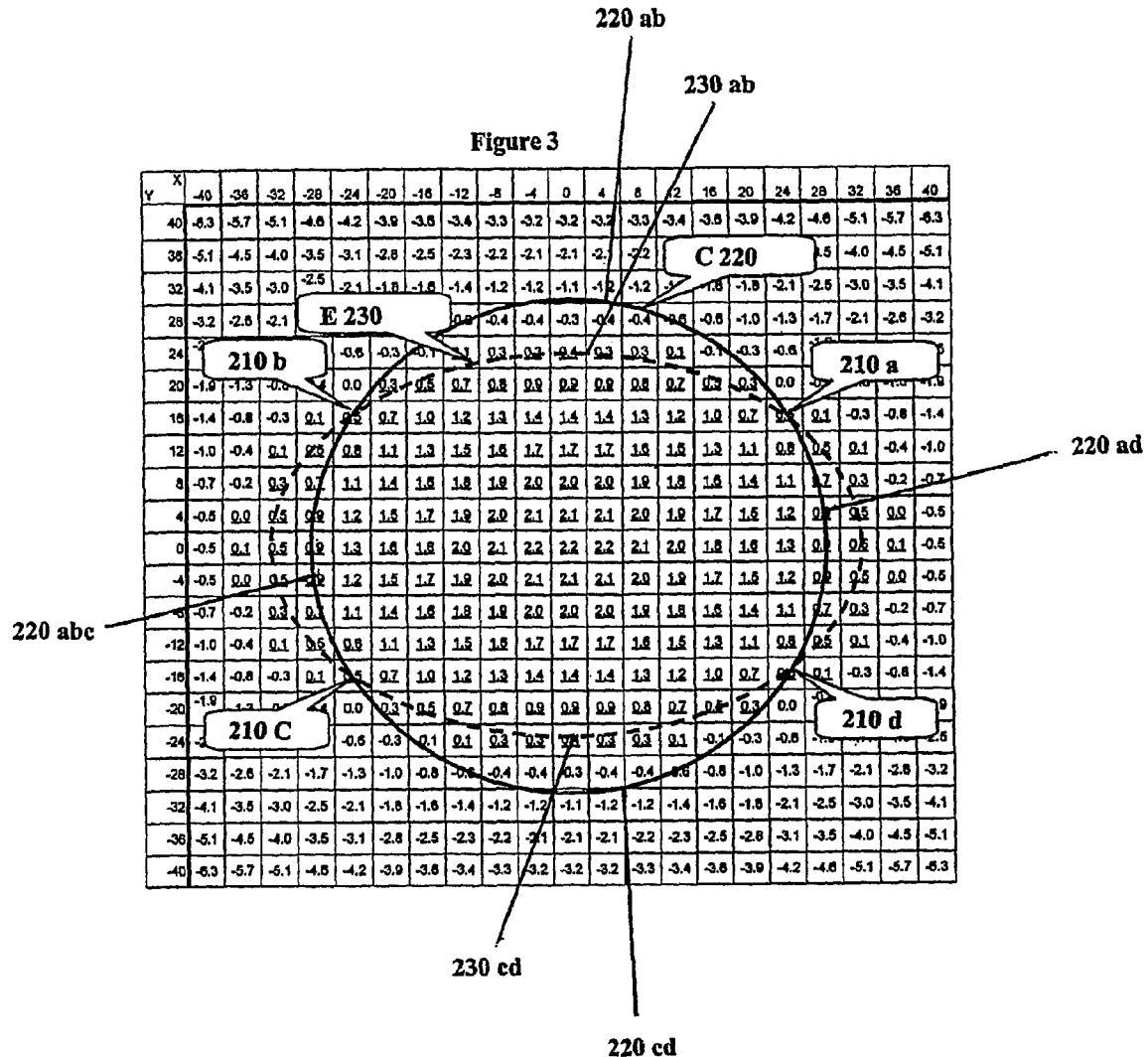
FIG. 3 depicts the graph of FIG. 1 overlaid by two sets of contours, C and E, and points a, b, c, and d at which C and E intersect.

The thickness function t and cribbed diameter, function $C_{diam}$ are then used to determine a first set of points $C^{[-]}$ existing on the continuous contour C 220 of the cribbed diameter that describe a portion of, or all of the cribbed diameter, at which the thickness does not satisfy the thickness requirement or, in other words, at which $t<ET_{min}$, such as $C_{ab}$ 220ab and $C_{cd}$ 220cd as shown on FIG. 3. As shown on FIG. 3, a, b, c, and d 210a-d are points at which contour C 220 intersect with contour E 230. Contour E 230 is the contour at which $t=ET_{min}$. One ordinarily skilled in the art will realize that, if a set of points $C^{[-]}$ does not exist and the thickness requirement is satisfied, no additional calculations are necessary.

In the case in which the thickness requirement is not satisfied, the thickness function t and cribbed diameter function $C_{diam}$ are used to determine a second set of points $C^{[+]}$ on C 220 that describe the portion of the cribbed diameter at which the thickness t does satisfy the thickness requirement, or $t \geq ET_{min}$. The set of points $C^{[+]}$ will remain with the desired blunt edge profile for the uncut lens, such as $C_{bc}$ 220bc and $C_{ad}$ 220ad shown in the example used in FIG. 3. The mathematical union of the sets of points $C^{[-]}$ and $C^{[+]}$ represents C 220 where:

$$C = C^{[-]} \cup C^{[+]} \quad \text{(III)}$$

For FIG. 3, $C^{[-]} = (C_{ab} \cup C_{cd})$ and $C^{[+]} = (C_{bc} \cup C_{da})$ In the next step of the methods, the thickness function t, contour E 230 and the cribbed diameter contour C 220 are used to determine a third set of points $E^{[+]}$ on E 230 contained within the contour C 220, such as $E_{ab}$ 230ab and $E_{cd}$ 230cd shown in the example used in FIG. 3.

The sets of points $E^{[+]}$ and $C^{[+]}$ may then be combined to provide a continuous, composite, blunt edge contour B 310, as shown in FIG. 4, where:

$$B = E^{[+]} \cup C^{[+]} \quad \text{(IV)}$$

For FIG. 4, $E^{[+]} = (E_{ab} \cup E_{cd})$. Once the blunt edge contour is determined, either the blank or uncut lens is cut to contour B310 using any commercially available and convenient machine capable of performing non-round perimeter cutting, such as a computer-numerically controlled ("CNC") lens surfacing machine. Cribbing the lens with contour B 310 will result in a blunt edge on the entire perimeter of the uncut lens.

In an optional, but preferred step, the impact of forming the blunt edge contour can be weighed against one manufacturing constraint as follows. A circular disk of bonding alloy is commonly formed between the lens blank and a holding block to attach the lens blank to the holding block prior to cribbing, cutting, or surfacing. The size of the alloy can be any one of a variety of diameters. The alloy is an expensive, low melting point, heavy metal. It is desirable to maintain greater than a minimum amount of lens material, or minimum alloy allowance, $AA_{min}$, between the uncut lens perimeter, represented by the blunt edge contour B 310, and the alloy perimeter such that alloy cutting is avoided. The contour representing the perimeter of the alloy can be represented as a set of points A and the alloy allowance can be defined by a set of distances, AA, where:

$$AA = B - A \quad \text{(V)}$$

Equation V may be used to determine if the $AA_{min}$ has been exceeded, $AA < AA_{min}$. If so, adjustments can be made to one or more of the alloy diameter, the blocking location, and the targeted lens center thickness 20 and then a new iteration of the above steps can be performed.

Yet another optional step is directed to lens edging. Uncut lenses must be removed from the alloy holding block and then be cut to the shape of the spectacle frame or rimless pattern. It is typically desirable to allow a minimum amount of material, $EA_{min}$, between the uncut lens perimeter and the frame or rimless contour to account for processing variability and ensure the edged lens will completely fill the spectacle frame or rimless pattern. The contour representing the final edged lens periphery can be represented as a set of points, F, and the edging allowance can be defined by a set of distances, EA, where:

$$EA = B - F \quad \text{(VI)}$$

Equation (VI) may be used to determine if the $EA_{min}$ has been exceeded, $EA < EA_{min}$. In the case that it is exceeded, adjustments can be made to one or more of the cribbed diameter size, the cribbed diameter location, or the targeted lens center thickness 20 and then a new iteration of the steps of the method.

A number of embodiments of the invention have been described. Nevertheless, it will be understood that various modifications may be made without departing from the spirit and scope of the invention.

What is claimed is:

1. A method for manufacturing a spectacle lens comprising using a thickness that is at least a minimum edge thickness, at least one of a plurality of a set of points associated with a thickness function, and at least one of a plurality of a set of points within a cribbed diameter to determine a contour for cutting an uncut lens blank having at least the thickness that is at least a minimum edge thickness, and wherein the minimum edge thickness is about 0.1 mm to about 2 mm.

2. The method of claim 1 wherein the thickness function is determined using a model of a front and a back surface of the uncut lens to attain an optical prism target and a lens center thickness.

3. The method of claim 2 further comprising using a prism reference point of the front and back surface and a slope of the front and back surface at the prism reference point to attain the optical prism target and the lens center thickness.

4. The method of claim 2 wherein the cribbed diameter is determined using a blocking location, wherein the coordinate system of the blocking location coincides with the coordinate system of the thickness function.

5. The method of claim 1 further comprising using at least one of a plurality of a set of points meeting a minimum alloy allowance requirement to determine the contour for cutting the uncut lens blank.

6. The method of claim 1 further comprising using at least one of a plurality of a set of points meeting an edging allowance requirement to determine the contour for cutting the uncut lens blank.

7. A method for manufacturing a spectacle lens, comprising the steps of: a.) determining a minimum edge thickness for an uncut lens; b.) using the minimum edge thickness to determine a thickness requirement; c.) calculating a thickness function t of the uncut lens; d.) calculating a cribbed diameter of the uncut lens; e.) using the thickness function and cribbed diameter to determine a first set of points (220ab, 220cd) that does not satisfy the thickness requirement and a second set of points (220bc, 220ad) that satisfies the thickness requirement; f.) determining a third set of points (230ab, 230cd) that describe a diameter contained within the cribbed diameter; g.) combining the second set of points with the third set of points to provide an edge contour for the uncut lens; and h.) comprising (i) representing a perimeter of an alloy as a set of points A, (ii) defining an alloy allowance b a set of distances AA wherein AA=B−A, where B is a blunt edge contour, and (iii) determining if a minimum alloy allowance has been exceeded.

8. The method of claim 7, wherein step c.) further comprises (i) using an optical prism target and a lens center thickness and (ii) using a mathematical model of a front and a back surface of the uncut lens in a coordinate system wherein a prism reference point of each surface and a slope of each surface at the prism reference point is such that the optical prism target and center thickness will be attained.

9. The method of claim 8, wherein step d.) further comprises using a blocking location and a crib diameter wherein the coordinate system of the blocking location is coincident with the coordinate system of step c).

10. The method of claim 7, further comprising step i.) comprising (i) representing a final edged periphery of the lens as a set of points F, (ii) defining an edging allowance by a set of distances EA wherein EA=B−F, and (iii) determining if a minimum edging allowance has been exceeded.

11. A lens produced according to a method comprising using a thickness that is at least a minimum edge thickness, at least one of a plurality of a set of points associated with a thickness function, and at least one of a plurality of a set of points within a cribbed diameter to determine a contour for cutting an uncut lens blank having at least the thickness that is at least a minimum edge thickness, wherein the minimum edge thickness is about 0.1 mm to about 2 mm.

12. The lens of claim 11 wherein the thickness function is determined using a model of a front and a back surface of the uncut lens to attain an optical prism target and a lens center thickness.

13. The lens of claim 12 further comprising using a prism reference point of the front and back surface and a slope of the front and back surface at the prism reference point to attain the optical prism target and the lens center thickness.

14. The lens of claim 12 wherein the cribbed diameter is determined using a blocking location, wherein the coordinate system of the blocking location coincides with the coordinate system of the thickness function.

15. The lens of claim 11 further comprising using at least one of a plurality of a set of points meeting a minimum alloy allowance requirement to determine the contour for cutting the uncut lens blank.

16. The lenses of claim 11 further comprising using at least one of a plurality of a set of points meeting an edging allowance requirement to determine the contour for cutting the uncut lens blank.

* * * * *